(12) United States Patent
Eisenberg et al.

(10) Patent No.: US 10,909,324 B2
(45) Date of Patent: Feb. 2, 2021

(54) FEATURES FOR CLASSIFICATION OF STORIES

(71) Applicants: Joshua Daniel Eisenberg, Miami, FL (US); Mark Finlayson, Miami, FL (US)

(72) Inventors: Joshua Daniel Eisenberg, Miami, FL (US); Mark Finlayson, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 99 days.

(21) Appl. No.: 16/260,389

(22) Filed: Jan. 29, 2019

(65) Prior Publication Data
US 2020/0081980 A1 Mar. 12, 2020

Related U.S. Application Data

(60) Provisional application No. 62/728,380, filed on Sep. 7, 2018.

(51) Int. Cl.
*G06F 40/30* (2020.01)
*G06N 20/10* (2019.01)
(Continued)

(52) U.S. Cl.
CPC ............ *G06F 40/30* (2020.01); *G06F 16/353* (2019.01); *G06F 40/205* (2020.01);
(Continued)

(58) Field of Classification Search
CPC ............... G06F 16/3329; G06F 16/353; G06F 17/30864; G06F 40/205; G06F 40/211; G06F 40/284; G06F 40/30; G06F 3/16; G06K 9/00442; G06N 7/005; G06N 20/00; G06N 20/10; G06N 5/022
(Continued)

(56) References Cited

U.S. PATENT DOCUMENTS 7,779,049 B1 * 8/2010 Phillips ............... G06F 16/3322
707/809
8,775,341 B1 * 7/2014 Commons ............... G10L 15/16
706/20

(Continued)

OTHER PUBLICATIONS

Karin Kipper Schuler, VerbNet: A Broad-Coverage, Comprehensive Verb Lexicon, Ph.D. thesis in Computer and Information Science, University of Pennsylvania, 2005.

*Primary Examiner* — Gerald Gauthier
(74) *Attorney, Agent, or Firm* — Saliwanchik, Lloyd & Eisenschenk

(57) ABSTRACT

Methods and devices for story detection in text are provided. A device can include an input device for receiving text data a processor configured to: tokenize each paragraph in the text data and split each tokenized paragraph into sentences; parse each sentence from the tokenized paragraphs; label each predicate in each sentence with its respective semantic role; and assign a verb class to each predicate; and determine whether respective arguments of each predicate contains a character. The device can further include a support vector machine configured to determine whether a story is present within each paragraph based upon whether each predicate contains a character.

13 Claims, 1 Drawing Sheet

(51) Int. Cl.
　　　*G06F 16/35*　　　(2019.01)
　　　*G06K 9/00*　　　(2006.01)
　　　*G06F 40/205*　　(2020.01)
　　　*G06F 40/284*　　(2020.01)
(52) U.S. Cl.
　　　CPC ....... *G06F 40/284* (2020.01); *G06K 9/00442* (2013.01); *G06N 20/10* (2019.01)
(58) Field of Classification Search
　　　USPC ...... 704/9, 10, 272; 707/722, 809, 752, 771; 706/13, 20; 715/744
　　　See application file for complete search history.

(56) References Cited

U.S. PATENT DOCUMENTS

| | | | | |
|---|---|---|---|---|
| 8,972,265 | B1* | 3/2015 | Lester | G10L 13/00 704/246 |
| 9,330,175 | B2* | 5/2016 | Bobick | G06N 5/022 |
| 10,191,975 | B1* | 1/2019 | Eisenberg | G06F 40/166 |
| 10,599,700 | B2* | 3/2020 | Davulcu | G06F 40/30 |
| 10,621,390 | B1* | 4/2020 | Winston | G06F 40/169 |
| 2005/0021324 | A1* | 1/2005 | Brants | G06F 40/30 704/9 |
| 2008/0183759 | A1* | 7/2008 | Dehlinger | G06F 16/382 |
| 2008/0319735 | A1* | 12/2008 | Kambhatla | G06F 40/30 704/9 |
| 2010/0082333 | A1* | 4/2010 | Al-Shammari | G06F 40/242 704/10 |
| 2010/0153321 | A1* | 6/2010 | Savvides | G06N 7/00 706/13 |
| 2013/0073979 | A1* | 3/2013 | Shepherd | G06F 40/284 715/744 |
| 2014/0040312 | A1* | 2/2014 | Gorman | G06F 40/30 707/771 |
| 2014/0365206 | A1* | 12/2014 | Convertino | G06F 40/279 704/9 |
| 2015/0186504 | A1* | 7/2015 | Gorman | G06F 40/30 707/752 |
| 2016/0110433 | A1* | 4/2016 | Sawhney | G06F 40/30 707/722 |
| 2016/0364476 | A1* | 12/2016 | Curin | G06F 40/268 |
| 2017/0116204 | A1* | 4/2017 | Davulcu | G06F 16/355 |
| 2017/0192958 | A1* | 7/2017 | Misra | G06F 40/30 |
| 2017/0277676 | A1* | 9/2017 | Vogel | G06F 40/284 |
| 2017/0371861 | A1* | 12/2017 | Barborak | G06N 3/006 |
| 2020/0019370 | A1* | 1/2020 | Doggett | G06F 16/24578 |
| 2020/0081980 | A1* | 3/2020 | Eisenberg | G06F 40/30 |

\* cited by examiner

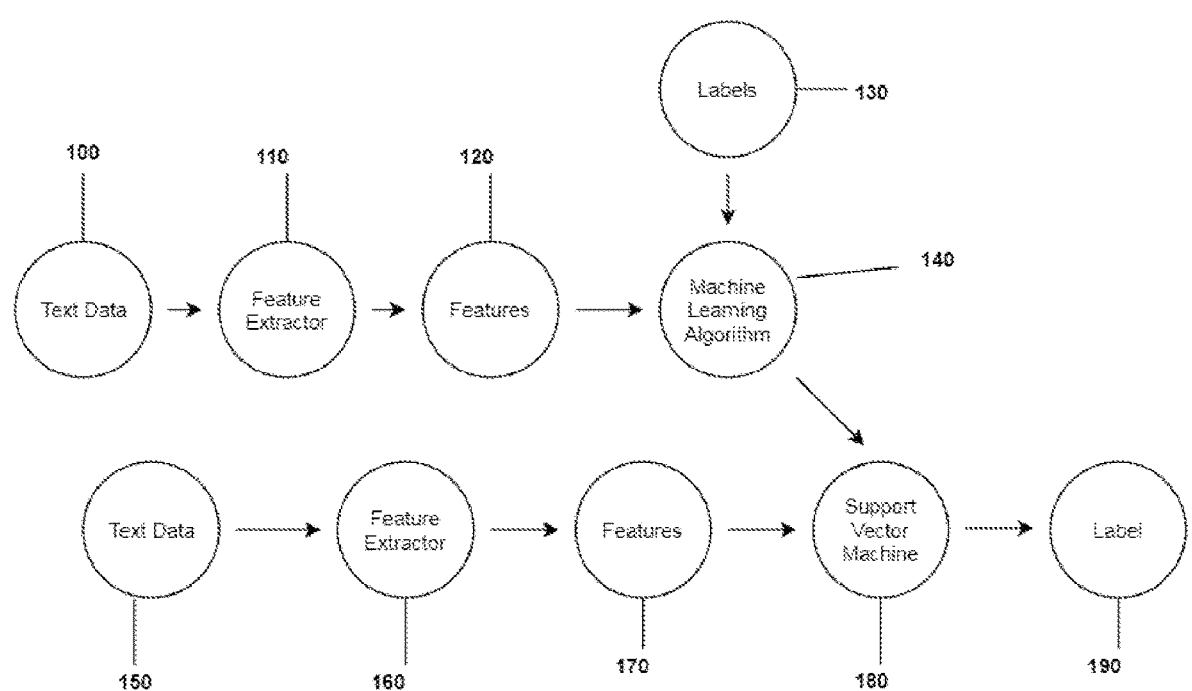

FEATURES FOR CLASSIFICATION OF STORIES

CROSS-REFERENCE TO A RELATED APPLICATION

This application claims the benefit of U.S. Provisional Application Ser. No. 62/728,380, filed Sep. 7, 2018, which is hereby incorporated by reference herein in its entirety, including any FIGURES, tables, and drawings.

STATEMENT OF GOVERNMENT SUPPORT

This invention was made with government support under Grant No. 5R01GM105033-02 awarded by National Institutes of Health. The government has certain rights in the invention.

BACKGROUND

Stories can be used for many interesting natural language processing (NLP) tasks, and much can be learned from them, including concrete facts about specific events, people, and things; commonsense knowledge about the world; and cultural knowledge about the societies in which we live. Applying NLP directly to the large and growing number of stories available electronically, however, has been limited by the inability to efficiently separate story from non-story text. For the most part, studies of stories per se have relied on manual curation of story data sets, which is time-consuming, expensive, and doesn't scale. These human-driven methods pay no attention to the large number of stories generated daily in news, entertainment, and social media.

Previous approaches to story detection have relied on tens of thousands of features, and have used complicated pre-processing pipelines. Moreover these prior systems did not include features that captured the "essence" of stories. Furthermore, these prior efforts had poor generalizability (i.e., when trained on one corpus, the detectors perform poorly when tested on a different corpus).

In 2009, Gordan and Swanson developed a bag-of-words-based detector using blog data (Gordon and Swanson, 2009). They annotated a subset of paragraph-sized posts in the Spinn3r Blog corpus for the presence of stories, and used this data to train a confidence weighted linear classifier using all unigrams, bigrams, and trigrams from the data. Their best $F_1$ was 0.55. This was an important first step in story detection, and the annotated corpus of blog stories is an invaluable resource.

In 2012, Corman et al. developed a semantic triplet-based detector using Islamist Extremist texts. They annotated paragraphs of the CSC Islamic Extremist corpus for the presence of stories, and used this data to train an SVM with a variety of features including the top 20,000 tf-idf tokens, use of stative verbs, and agent-verb-patient triplets. Their best performing detector in that study achieved 0.63 $F_1$. The intent of the semantic triplet features was to encode the plot and the characters. Although Corman's detector has a higher $F_1$ than Gordon's, it was not clear which one is actually better.

Braud et al. achieved domain independence in the identification of implicit relations between discourse units by training their system on both natural and synthetic data, weighting the influence of the two types. Jansen et al., as another example, demonstrated domain independence on the task of non-factoid question answering by using both shallow and deep discourse structure, along with lexical features, to train their classifiers. Thus, domain independence is certainly possible for discourse related tasks, but there does not yet seem to be a one-size-fits-all solution.

BRIEF SUMMARY

Story detection is the task of determining whether or not a unit of text contains a story. Prior approaches achieved a maximum performance of 0.66 $F_1$, and did not generalize well across different corpora. Embodiments of the subject invention provide a detector that achieves a maximum performance of 0.75 $F_1$ (a 14% improvement), with greater generalizability than previous work. In particular, the detector achieves performance above a 0.70 $F_1$ across a variety of combinations of lexically different corpora for training and testing, as well as dramatic improvements (up to 4,000%) in performance when trained on a small, disfluent data set. The detector can use two types of features, including features related to events, and features related to characters (totaling 283 specific features overall); whereas previous detectors used tens of thousands of features.

$F_1$ is the harmonic average of precision and recall. The range of $F_1$ is between 0 and 1, where 1 is perfect $F_1$ and what a classifier aims to achieve. $F_1$ is defined by the following equation, and it is noted that $F_1$, precision, and recall are well known in the art as standards used in measuring classification tasks.

$$F_1 = \left(\frac{\text{recall}^{-1} + \text{precision}^{-1}}{2}\right)^{-1} = 2 \cdot \frac{\text{precision} \cdot \text{recall}}{\text{precision} + \text{recall}} \quad (1)$$

Embodiments of the subject invention comprise a detector that uses a set of 283 features that accurately classify the presence of story content in text. Experimental results described herein show that using these features accurately classifies the story content of text. Open source libraries in the feature extraction pipeline, for example Stanford Core NLP, were used to break each text into sentences and tokens, and libSVM was used for a Java implementation of support vector machines. A feature extraction pipeline was created in Java demonstrated that the use the 283 features accurately classified the story content of text in paragraphs.

The value of each element depends on whether a verb from the associated verb class is used in the paragraph. Each element of the vector can have three values: the first value represents when a verb from the element's corresponding verb class is used in the paragraph and also involves a character as an argument of the verb. The second value represents when a verb from the verb class is used, but there are no characters involved. The third value represents the situation where no verbs from the verb class are used in the paragraph.

Whether there is a character in any of the arguments of the verb refers to whether or not there are any characters from the story related to the action occurring as a result of the verb. An argument involves a character if it contained either: (1) a gendered pronoun; or (2) a named entity of a person or organization.

The other five features are the normalized lengths of the five longest co-reference chains. To encode this as a feature, the respective normalized lengths of the five longest co-reference chains can be calculated, and these can be used as the character features. These values can be computed by extracting co-reference chains from each paragraph, filtering out co-reference chains that do not contain a character reference as defined in above (i.e., a named entity of type person or organization, or a gendered pronoun), sorting the chains within each paragraph with respect to the number of references in the chain, and normalizing the chain lengths by dividing the number of referring expression in each chain by the number of sentences in the paragraph.

In an embodiment, a story detection device can comprise: 1) an input device configured to receive text data; 2) a processor configured to: a) tokenize each paragraph in the text data and split each tokenized paragraph into sentences; b) parse each sentence from the tokenized paragraphs; c) label each predicate in each sentence with its respective semantic role; d) assign a verb class from a predetermined list to each predicate; and e) determine whether respective arguments of each predicate contain a character; and 3) a support vector machine configured to determine whether a story is present within each paragraph based upon whether each predicate contains a character.

In another embodiment, a story detection device can comprise: 1) an input device configured to receive text data; 2) a processor configured to: a) extract co-reference chains from each paragraph of the text data; b) filter out co-reference chains that do not contain a character reference; c) sort the co-reference within each paragraph with respect to the number of references in the each respective co-reference chain; and d) normalize respective lengths of each co-reference chain; and 3) a support vector machine configured to predict whether a story is present within each paragraph based upon the normalized lengths of each co-reference chain.

BRIEF DESCRIPTION OF THE DRAWINGS

FIG. 1 is a block diagram of a detection device.

DETAILED DESCRIPTION

The following disclosure and exemplary embodiments are presented to enable one of ordinary skill in the art to make and use methods and devices for automatic detection of stories in text according to the subject invention. Various modifications to the embodiments will be readily apparent to those skilled in the art and the generic principles herein may be applied to other embodiments. Thus, the devices and methods related to automatic detection of stories in text are not intended to be limited to the embodiments shown, but are to be accorded the widest scope consistent with the principles and features described herein.

Embodiments of the subject invention comprise a detector that uses a set of 283 features that accurately classify the presence of story content in text. In an embodiment, a story detection device can comprise: 1) an input device configured to receive text data; 2) a processor configured to: a) tokenize each paragraph in the text data and split each tokenized paragraph into sentences; b) parse each sentence from the tokenized paragraphs; c) label each predicate in each sentence with its respective semantic role; d) assign a verb class from a predetermined list to each predicate; and e) determine whether respective arguments of each predicate contain a character; and 3) a support vector machine configured to determine whether a story is present within each paragraph based upon whether each predicate contains a character.

In another embodiment, a story detection device can comprise: 1) an input device configured to receive text data; 2) a processor configured to: a) extract co-reference chains from each paragraph of the text data; b) filter out co-reference chains that do not contain a character reference; c) sort the co-reference within each paragraph with respect to the number of references in the each respective co-reference chain; and d) normalize respective lengths of each co-reference chain; and 3) a support vector machine configured to predict whether a story is present within each paragraph based upon the normalized lengths of each co-reference chain.

A narrative is a discourse presenting a coherent sequence of events which are causally related and purposely related, concern specific characters and times, and overall displays a level of organization beyond the commonsense coherence of the events themselves. In sum, a story is a series of events affected by animate actors. This reflects a general consensus among narratologists that there are at least two key elements to stories, namely, the plot (fabula) and the characters (dramatis personae) that move the plot forward. While a story is more than just a plot carried out by characters, critical to 'story-ness' is the connective tissue between these elements that can transport an audience to a different time and place.

In contrast to focusing on specific lexical items, the herein described methods and devices focuses on features that capture the essence of stories, namely, features focusing on (a) events involving characters, and (b) the characters themselves.

Verbs are often used to express events and this fact is used to approximate event detection in a computationally efficient but still relatively accurate manner. The first part of each feature vector for a paragraph comprises 278 dimensions, where each element of this portion of the vector represents one of the 278 verb classes in VerbNet.

The set of 283 features allows a computer to classify the story content of paragraphs of English texts. 278 of the 283 features are verb-based features. These features correspond to the 283 classes of verbs in VerbNet. The list of 278 verb classes is explicitly listed herein (see Verb Class List herein). These names refer to the different names of the VerbNet classes. Each element of the verb-based features can have one of three different values:

+2—a verb from the verb class is used in the paragraph, and in at least one use of a verb from that class there is a character in any of the arguments of the verb;

+1—a verb from the verb class is used in the paragraph, and there is no usage of characters in the arguments of these verbs; and −1—no verbs from the verb class are used in the paragraph.

The verb features represent the types of events that occur in a paragraph, and whether or not characters are involved in those events. Verb feature vectors can be extracted from different sentences that have similar meaning and result in the same feature value, because the verbs played and improvised belong to the performance VerbNet class, and both verbs have a character in one of their arguments. This allows a generalized encoding of the types of action that occurs in a text.

There are 283 features that can be extracted from paragraphs of raw text. One part of each feature vector comprises 278 dimensions, where each element of this portion of the vector represents one of the 278 verb classes in VerbNet. The value of each element depends on whether a verb from the associated verb class is used in the paragraph. Each element of the vector can have three values: the first value represents when a verb from the element's corresponding verb class is used in the paragraph and also involves a character as an argument of the verb. The second value represents when a verb from the verb class is used, but there are no characters involved. The third value represents the situation where no verbs from the verb class are used in the paragraph.

A verb feature extraction pipeline can comprise the following steps: (1) split each paragraph into tokens, assign part of speech tags, and split the text into sentences, all using Stanford CoreNLP; (2) parse each sentence with OpenNLP; (3) label each predicate with its semantic roles using the SRL from the Story Workbench; (4) disambiguate the WordNet sense for each open-class word using the It Makes Sense WSD system, using the Java WordNet Interface (JWI) to load and interact with WordNet; (5) assign one of 278 VerbNet verb classes to each predicate, based on the assigned Wordnet sense, and using the Verbnet library to interact with VerbNet; and (6) determine whether the arguments of each predicate contains characters by using the Stanford Named Entity Recognizer and a gendered pronoun list.

An argument can be considered to involve a character if it contained either (1) a gendered pronoun or (2) a named entity of type person or organization. Organizations can be treated as characters because they often fulfill that role in stories: for example, in the Extremist stories, organizations or groups like the Islamic Emirate, Hamas, or the Jews are agents or patients of important plot events. The verb features were encoded as a vector with length 278, each entry representing a different VerbNet verb class with three possible values: the verb class does not appear in the paragraph; the verb class appears but does not involve characters; or the verb class appears and a character is an agent, patient, or both.

The verb features represent the types of events that occur in a paragraph, and whether or not characters are involved in those events. This is a generalized version of the semantic triplets that Corman et al. used for their story detector (Ceran et al., 2012), where they paired verbs with the specific tokens in the agent and patient arguments. The disadvantage of Corman's approach was that it led to phrases with similar meaning being mapped to different features: for example, the sentences "Bob played a solo" and "Mike improvised a melody" are mapped to different features by the semantic triplet based detector, even though the meaning of the sentences are almost the same: a character is performing music. On the other hand, in our approach, when we extract verb feature vectors from these sentences, both result in the same feature value, because the verbs played and improvised belong to the performance VerbNet class, and both verbs have a character in one of their arguments. This allows a generalized encoding of the types of action that occurs in a text.

Another aspect of embodiments of the subject invention is character co-reference chains. Characters are a key element of stories. A character must be present to drive the action of the story forward. Stories can contain longer co-reference chains than non-stories. To encode this as a feature, the normalized length of the five longest co-reference chains can be calculated, and those values can be used as the character features.

The normalized lengths of the co-reference chains can be computed as follows: (1) extract co-reference chains from each paragraph using Stanford CoreNLP co-reference facility, (2) filter out co-reference chains that do not contain a character reference as described above (a named entity of type person or organization, or a gendered pronoun), (3) sort the chains within each paragraph with respect to the number of references in the chain, and (4) normalize the chain lengths by dividing the number of referring expression in each chain by the number of sentences in the paragraph.

These normalized chain lengths can be used to construct a five-element feature vector for use by a support vector machine (SVM). Testing on a development set of 200 Extremist paragraphs revealed that using the five longest chains produced the best result.

Referring to FIG. 1, embodiments of the subject invention provide a detector comprising a support vector machine and an overall machine learning architecture. The machine learning architecture can be subdivided into two phases—a training phase and a test phase. A device can receive, by an input device, text data 100 in either electronic format or in in physical form, scanned and analyzed through optical character recognition software, and a processor can extract the features 110 as provided in the Verb Class List. The features 120 can be received and processed by a support vector machine training algorithm 140. A user can provide labels, related to story or non-story to the machine learning algorithm. The data can be processed and transmitted, by a transmitting device, to the support vector machine which can label or annotate the data. This training process can be repeated until the support vector machine 180 can accurately predict a label 190 for the data within an acceptable error range. After the machine learning software has been trained, arbitrary text data 150 can be transmitted to a feature extractor 160 and the extracted features 170 can be transmitted to a support vector machine model 180 for labeling. A display device (not shown) can display the results of the support vector machine.

A key feature of embodiments of the subject invention is the choice of what features a processor/computing device is exposed to or made aware of in order to successfully classify the story content of paragraphs. SVMs, multilayer perceptron networks, Bayesian networks, or other types of algorithms can be used to create and/or train a computational model that can classify paragraphs for their story content. The 283 features based on the Verb Class List and VerbNet can be used, and this is quite different from any related art methods or devices.

Experts in narratology or linguistics would say that a story has plot and characters that do the actions that drive the plot forward. These are both abstract concepts, and there are no procedures or algorithms from narratology or linguistics for how to find plot events, how to group them into classes with semantic boundaries, or how to find main characters. Embodiments of the subject invention can use the Verb Class List and/or the associated numbers from VerbNet to encode what type of events are occurring, as well as use specific encodings for whether a character is an agent or patient of the verb that represents the event. Additionally, the length of coreference chains that are person or organization entities can be used to decide who the main characters in a story are. Related art methods would only indicate to find the characters that occur most often, but this is very abstract. There is no related art quantitative method from narratology or linguistics that allows a user to deterministically calculate who the main characters in a text are. Embodiments of the subject invention can advantageously take the lengths of the five longest coreference chains (of person or organization entities), and this is quite different from related art narratology or linguistics techniques.

Narratology assumes that people can automatically decide when a story is being told. In narratology, deciding whether a span of text has story content is a qualitative process. There is no quantitative or deterministic procedure in the narratology or linguistic literature for determining story classification. The abstract idea of "story" does not provide quantitative reasoning for determining story content. The use of 278 features based on VerbNet classes and five features based on frequency of main character occurrence, according to embodiments of the subject invention, is not directly derived from narrative theory or linguistics. These features are a way to sample the semantics and extract features that relate to elements of narrative from text. The 278 verb features allow the processor/computing device to be aware of what types of events are happening, and whether there is a character enacting these events. This is a method to sample whether there are elements of plot from a text. This is not a procedure that comes from narratology, but it is neuro-linguistic programming (NLP) based method for detecting if there are events that are enacted by characters. The five character features allow the processor/computing device to be aware of how often characters are mentioned. In stories there are usually a set of main characters that are frequently mentioned. Looking at the normalized length of the longest coreference chains allows the processor/computing device to be aware of how often main characters are mentioned. Narratology on its own does not tell readers to be aware of how often characters are mentioned, but just that characters are an essential element of stories.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLES—MATERIALS AND METHODS

An SVM with labeled data was trained from the texts in the CSC Islamist Extremist corpus, and the ICWSM 2009 Spinn3r Web Blog Corpus. The values of the 283 features were extracted from each paragraph in each corpus, and used to train the SVM model. A 10-fold cross validation was used to evaluate the performance of the diegesis classifier, which is to support the accuracy of the SVM model.

The CSC Islamic Extremist Corpus comprises 24,009 paragraphs, of which 3,300 contained a story. These texts recount Afghani and Jihadi activities in the mid-2000's in a variety of locations around the world. Web blog texts came from the ICWSM 2009 Spinn3r Dataset. The full data set contains 44 million texts in many languages. Most of the texts in the blog corpus are no more than 250 characters, roughly a paragraph. The distribution of texts can be seen in Table 1.

A Java implementation of LibSVM was used to train an SVM classifier with herein described features. The hyper-parameters for the linear kernel were $\gamma=0.5$, $v=0.5$, and $c=20$.

TABLE 1

| Corpus | Story | Non-Story |
|---|---|---|
| Extremist | 3,300 | 20,709 |
| Blog | 201 | 3,942 |

The results of the experiments are shown in Table 3. Precision, recall, and $F_1$ relative to the story and non-story classes are reported. Experiments were performed on three feature sets: the verb features alone (indicated by Verb in the table), character features alone (indicated by Char), and all features together (Verb+Char). Experiments were conducted ranging over three corpora: the Extremist corpus (Ext), the blog corpus (Web), and the union of the two (Comb). These results may be compared with the previously best performing detector, namely, Corman's semantic triplet based detector (Ceran et al., 2012), as tested (Eisenberg et al., 2016), and shown in Table 2.

In each of the experiments, the non-story class was undersampled before training. Undersampling is a technique used to help supervised machine learning classifiers learn more about a class that has a significantly smaller number of examples relative to an alternative. In the experiments, non-story labels outnumbered story labels by a factor of 7 overall. Extremist story paragraphs are only 15.9% of the total annotated paragraphs in that set, and in the blog corpus stories were only 4.9% of the paragraphs. To prevent the detector from being over trained on non-story paragraphs, the size of the nonstory training data was reduced to that of the story data, by randomly selecting a number of non-story texts equal to the number of story texts for training and testing.

Three versions of cross validation were used for the experiments, one for each experimental condition: training and testing on a single corpus; training on a single corpus and testing on the combined corpus; or training on the combined corpus and testing on a single corpus. Undersampling was performed before cross validation, so when describing herein how to divide up the story and non-story texts into cross validation folds, this refers to the full set of story texts and the set of non-story texts that was randomly selected to equal the number of story texts. For all experiments with cross validation, ten folds were used.

TABLE 2

| Training | Testing | Prec. | Recall | $F_1$ |
|---|---|---|---|---|
| Ext | Ext | 0.77 | 0.57 | 0.66 |
| Ext | Web | 0.23 | 0.37 | 0.28 |
| Ext | Comb | 0.43 | 0.41 | 0.32 |
| Web | Web | 0.66 | 0.31 | 0.43 |
| Web | Ext | 0.59 | 0.003 | 0.01 |
| Web | Comb | 0.59 | 0.01 | 0.01 |
| Comb | Ext | 0.62 | 0.51 | 0.43 |
| Comb | Web | 0.36 | 0.49 | 0.30 |
| Comb | Comb | 0.64 | 0.47 | 0.46 |

TABLE 3

| Features | Training | Testing | Prec. | Not Story Recall | $F_1$ | Prec. | Story Recall | $F_1$ |
|---|---|---|---|---|---|---|---|---|
| Verb | Ext | Ext | 0.73 | 0.81 | 0.77 | 0.78 | 0.70 | 0.74 |
| Verb | Web | Web | 0.69 | 0.75 | 0.72 | 0.73 | 0.66 | 0.69 |
| Char | Ext | Ext | 0.30 | 0.27 | 0.21 | 0.52 | 0.74 | 0.55 |
| Char | Web | Web | 0.67 | 0.68 | 0.67 | 0.67 | 0.65 | 0.65 |
| Verb + Char | Ext | Ext | 0.73 | 0.81 | 0.77 | 0.79 | 0.70 | 0.74 |
| Verb + Char | Ext | Web | 0.68 | 0.80 | 0.73 | 0.75 | 0.63 | 0.69 |
| Verb + Char | Ext | Comb | 0.70 | 0.77 | 0.73 | 0.75 | 0.67 | 0.71 |
| Verb + Char | Web | Web | 0.71 | 0.76 | 0.72 | 0.74 | 0.68 | 0.70 |
| Verb + Char | Web | Ext | 0.50 | 0.82 | 0.62 | 0.50 | 0.18 | 0.27 |
| Verb + Char | Web | Comb | 0.53 | 0.79 | 0.64 | 0.60 | 0.40 | 0.41 |
| Verb + Char | Comb | Ext | 0.74 | 0.81 | 0.77 | 0.79 | 0.71 | 0.75 |
| Verb + Char | Comb | Web | 0.68 | 0.74 | 0.70 | 0.72 | 0.64 | 0.67 |
| Verb + Char | Comb | Comb | 0.72 | 0.81 | 0.76 | 0.79 | 0.68 | 0.73 |

Train and test on a single corpus: If the training and testing corpus were the same, the stories were divided into ten subsets of equal size, and the undersampled non-stories were divided into ten subsets of equal size. For each fold of cross validation a different story set and non-story set (of the same index) were used as the testing set and the remaining nine were used for training.

Train on combined, test on single: If the training was done on the combined corpus, and the test corpus was either the weblog or Extremist corpus, which is referred to as the single test corpus, the stories were first divided from the single test corpus into ten equal sized sets, and then that corpus's non-stories was divided into ten equal sets. For each fold of cross validation a different story set and non-story set (of the same index) from the single test corpus were used as the testing set and the remaining nine are used for training. The texts from the other corpus (the corpus that is not the single test corpus), were undersampled and added to all ten folds of training.

Train on single, test on combined: If training was done on a single corpus, and the test corpus was the combined corpus, the stories from the single training corpus were divided into ten equal sized sets, and the undersampled non-stories from the single training corpus were divided into ten equal sized sets. For each fold of cross validation a different story set and non-story set (of the same index) from the single training corpus were used as the testing set and the remaining nine were used for training. The texts from the other corpus (the corpus that is not the single training corpus), were undersampled and added to all ten folds of testing.

Example 1

For every experiment that used only a single corpus, the best feature set included both the verb and character features, achieving up to a 0.74 $F_1$ when trained and tested on the Extremist corpus. This is about 12.6% greater than the performance of Corman's detector when trained and tested on the same corpus (0.66 $F_1$).

When the detector used only verb features it achieved an $F_1$ of 0.74 on the Extremist corpus, only 0.002 lower than the detector using all the features. The detector achieved a 0.55 $F_1$ using only the five character features. To put this in perspective, the Corman detector (Ceran et al., 2012) used more than 20,000 features, and achieved an $F_1$ of 0.66. Thus the herein described detector was able to achieve 83% of the performance of the Corman detector with 4,000 times fewer features.

When training and testing on the blog corpus, the detector using all the features achieved a 0.70 $F_1$, a 74% increase from the Corman detector's 0.425 $F_1$. This is the best performing model on the blog corpus, from any experiment to date. The detector using only verb features achieved a 0.74 $F_1$. When trained using only the character features, the system achieved a 0.65 $F_1$, which is 54% higher than when the Corman detector is trained and tested on the blog corpus.

In the single corpus experiments, the detectors that were trained and tested on the Extremist paragraphs had higher performance than those trained on the web blogs, except for when only the five character features were used. A possible reason for this is the Stanford NER may not recognize the correct named entities in the Extremist texts, which contain many non-Western names, (e.g., Mujahidin, Okba ibn Nafi, or Wahid). However, when the verb features were included, the detectors trained on the Extremist texts achieved better performance. This could be partially due to the greater number of stories in the Extremist corpus, and their increased grammatical fluency. The Extremist corpus being well written compared to the blog corpus, the latter of which contains numerous fragmentary and disjointed posts.

Example 2

The generalizability of the detector (that including both verb and character features) can be demonstrated by training it on one corpus and testing it on another.

When the detector was trained on the Extremist texts and tested on the blog texts, it scores a 0.68 $F_1$. This is 142% improvement over Corman's detector in the same setup (0.28 $F_1$), and is a higher $F_1$ than the previous state-of-the-art on any single corpus test. When the detector was trained on the Extremist corpus and tested on the combined corpus, it achieved a 0.71 $F_1$, which is a 121% increase from Corman's detector in the equivalent setup.

For the detector trained on the blog corpus and tested on the Extremist corpus, the detector that used both verbs and character features achieved a 0.27 $F_1$, which is a 2,600% increase over the Corman detector's 0.01 $F_1$ in this same setup. This is further evidence that our verb and character feature based detector is significantly more generalizable than Corman's approach.

As seen in the experiments, detectors trained on only the blog corpus did not perform as well as detectors trained on the Extremist corpus. This could be partially due to the disfluent nature of the blog corpus, which includes many fragmentary sentences, grammatical errors, and slang, all of which are difficult for the NLP pipeline to handle.

No cross validation was performed in the above experiments where the detector was trained on the Extremist corpus and tested on the blog corpus, or vice versa, because in these cases the training and testing sets had no intersection.

The cross corpus experiment with the largest percent increase was for the verb and character detector trained on the blog corpus and tested on the combined corpus. The detector's $F_1$ is 0.41, a 4,000% increase from the Corman detector's 0.01 $F_1$ on this task. This is further evidence that our verb and character feature based detector is significantly more generalizable than Corman's approach.

The remaining five cross corpus experiments involved the combined corpus. In this case, the detector out-performed Corman's detector. The detector was trained on the combined corpus and tested on the Extremist corpus. It achieved a 0.75 $F_1$, which is 0.01 points of $F_1$ higher than a single corpus detector, which was trained and tested on the Extremist corpus. This suggests that information gleaned from the blog corpus does help classification of the Extremist texts.

It is noted that, if the term "Verb Class List" is recited in the claims (with this exact classification and phrasing), it refers to the Verb Class List presented immediately below this paragraph. The number after each verb in the Verb Class List refers to the VerbNet (see, e.g., http://verbs.colorado.edu/~mpalmer/projects/verbnet.html) class ID for the verb.

Verb Class List
absorb—39.8
accept—77
accompany—51.7
acquiesce—95
addict—96
adjust—26.9
admire—31.2
admit—65
adopt—93
advise—37.9
allow—64
amalgamate—22.2
amuse—31.1
animal sounds—38
appeal—31.4
appear—48.1.1
appoint—29.1
assessment—34.1
assuming_position—50
avoid—52
banish—10.2
base—97.1
battle—36.4
become—109.1
beg—58.2
begin—55.1
being_dressed—41.3.3
bend—45.2
benefit—72.1
berry—13.7
bill—54.5
body_internal_motion—49
body_internal_states—40.6
braid—41.2.2
break—45.1
breathe—40.1.2
bring—11.3
build—26.1
bulge—47.5.3
bump—18.4
butter—9.9
calibratable_cos—45.6
calve—28
captain—29.8
care—88.1
carry—11.4
carve—21.2
change_bodily_state—40.8.4
characterize—29.2
chase—51.6
cheat—10.6
chew—39.2
chit_chat—37.6
classify—29.10
clear—10.3
cling—22.5
coil—9.6
coloring—24
complain—37.8
complete—55.2
comprehend—87.2
comprise—107.1
concealment—16
confess—37.10
confine—92
confront—98
conjecture—29.5
consider—29.9
conspire—71
consume—66
contiguous_location—47.8
continue—55.3
contribute—13.2
convert—26.6.2
cooking—45.3
cooperate—73
cope—83
correlate—86.1
correspond—36.1
cost—54.2
crane—40.3.2
create—26.4
curtsey—40.3.3
cut—21.1
debone—10.8
declare—29.4
dedicate—79
deduce—97.2
defend—72.2
destroy—44
devour—39.4
differ—23.4
dine—39.5
disappearance—48.2
disassemble—23.3
discover—84
dress—41.1.1
dressing_well—41.3.2
drive—11.5
dub—29.3
eat—39.1
empathize—88.2
enforce—63 engender—27
ensure—99
entity_specific_cos—45.5
entity_specific_modes_being—47.2
equip—13.4.2
escape—51.1
establish—55.5
estimate—34.2
exceed—90
exchange—13.6
exhale—40.1.3
exist—47.1
feeding—39.7
ferret—35.6
fill—9.8
fire—10.10
fit—54.3
flinch—40.5
floss—41.2.1
focus—87.1
forbid—67
force—59
free—80
fulfilling—13.4.1
funnel—9.3
future_having—13.3
get—13.5.1
give—13.1
gobble—39.3
gorge—39.6
groom—41.1.2
grow—26.2
help—72
herd—47.5.2
hiccup—40.1.1
hire—13.5.3
hit—18.1
hold—15.1
hunt—35.1
hurt—40.8.3
illustrate—25.3
image_impression—25.1
indicate—78
inquire—37.1.2
instr_communication—37.4
interrogate—37.1.3
investigate—35.4
involve—107
judgment—33
keep—15.2
knead—26.5
learn—14
leave—51.2
lecture—37.11
light_emission—43.1
limit—76
linger—53.1
lodge—46
long—32.2
manner_speaking—37.3
many—36.2
marvel—31.3
masquerade—29.6
matter—91
meander—47.7
meet—36.3
mine—10.9
mix—22.1
modes_of_being_with_motion—47.3
multiply—108
murder—42.1
neglect—75
nonvehicle—51.4.2
nonverbal_expression—40.2
obtain—13.5.2
occurrence—48.3
order—60
orphan—29.7
other_cos—45.4
overstate—37.12
own—100
pain—40.8.1
patent—101
pay—68
peer—30.3
pelt—17.2
performance—26.7
pit—10.7
pocket—9.10
poison—42.2
poke—19
pour—9.5
preparing—26.3
price—54.4
promise—37.13
promote—102
pronounce—29.3.1
push—12
put_direction—9.4
put_spatial—9.2
put—9.1
reach—51.8
reflexive_appearance—48.1.2
refrain—69
register—54.1
rehearse—26.8
relate—86.2
rely—70
remedy—45.7
remove—10.1
render—29.90
require—103
resign—10.11
risk—94
roll—51.3.1
rummage—35.5
run—51.3.2
rush—53.2
say—37.7
scribble—25.2
search—35.2
see—30.1
seem—109
send—11.1
separate—23.1
settle—89
shake—22.3
sight—30.2
simple_dressing—41.3.1
slide—11.2
smell_emission—43.3
snooze—40.4
sound_emission—43.2
sound_existence—47.4 spank—18.3
spatial_configuration—47.6
spend_time—104
split—23.2
spray—9.7
stalk—35.3
steal—10.5
stimulus_subject—30.4
stop—55.4
subjugate—42.3
substance_emission—43.4
succeed—74
suffocate—40.7
suspect—81
sustain—55.6
swarm—47.5.1
swat—18.2
talk—37.5
tape—22.4
tell—37.2
throw—17.1
tingle—40.8.2
touch—20
transcribe—25.4
transfer_mesg—37.1.1
try—61
turn—26.6.1
urge—58.1
use—105
vehicle_path—51.4.3
vehicle—51.4.1
void—106
waltz—51.5
want—32.1
weather—57
weekend—56
wink—40.3.1
wipe_instr—10.4.2
wipe_manner—10.4.1
wish—62
withdraw—82

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all FIGURES and tables, to the extent they are not inconsistent with the explicit teachings of this specification.

What is claimed is:

1. A story detection device, comprising:
   an input device configured to receive text data;
   a processor configured to:
      tokenize each paragraph in the text data and split each tokenized paragraph into sentences;
      parse each sentence from the tokenized paragraphs;
      label each predicate in each sentence with its respective semantic role;
      assign a verb class from a predetermined list to each predicate, the predetermined list being Verb Class List presented herein; and
      determine whether respective arguments of each predicate contain a character;
   a support vector machine configured to determine whether a story is present within each paragraph based upon whether each predicate contains a character; and
   a transmitting device for transmitting the verb classes to the support vector machine in the form of a feature vector,
   each element of the feature vector having one of these respective values, the first value representing when a verb from the element's corresponding verb class is used in the paragraph and also involves a character as an argument of the verb, the second value representing when a verb from the verb class is used but there are no characters involved, and the third value representing the situation where no verbs from the verb class are used in the paragraph.

2. The device according to claim 1, the text data being in electronic format.

3. The device according to claim 1, further comprising a scanning device and optical character recognition software, the text data being in physical form.

4. The device according to claim 1, a respective argument being determined to contain a character when the argument contains either a gendered pronoun or a named entity of a person or organization.

5. The device according to claim 1, the first value being +2, the second value being +1, and the third value being −1.

6. The device according to claim 1, further comprising a display device for displaying the determination of the support vector machine.

7. A story detection device, comprising:
   an input device configured to receive text data;
   a processor configured to:
      extract co-reference chains from each paragraph of the text data;
      filter out co-reference chains that do not contain a character reference;
      sort the co-reference within each paragraph with respect to the number of references in the each respective co-reference chain; and
      normalize respective lengths of each co-reference chain by dividing the number of referring expressions in each chain by the number of sentences in the respective paragraph; and
   a support vector machine configured to predict whether a story is present within each paragraph based upon the normalized lengths of each co-reference chain.

8. The device according to claim 7, the text data being in electronic format.

9. The device according to claim 7, further comprising a scanning device and optical character recognition software, the text data being in physical form.

10. The device according to claim 7, the number of co-reference chains being from 1 to 10.

11. The device according to claim 7, the number of co-reference chains being five.

12. The device according to claim 7, further comprising a transmitting device for transmitting the normalized respective lengths of the co-reference chains to the support vector machine in the form of a feature vector.

13. The device according to claim 7, further comprising a display device for displaying the determination of the support vector machine.

* * * * *